US007621520B2

(12) United States Patent
Liatard et al.

(10) Patent No.: US 7,621,520 B2
(45) Date of Patent: Nov. 24, 2009

(54) DEVICE FOR SURFACE TREATMENT OF OBJECTS WITH REDUCED SIZE AND IMPROVED ERGONOMICS

(75) Inventors: Yves Liatard, Nantes (FR); Didier Godard, Varades (FR)

(73) Assignee: Evolis Card Printer, SA, Beaucouze (FR)

( * ) Notice: Subject to any disclaimer, the term of this patent is extended or adjusted under 35 U.S.C. 154(b) by 298 days.

(21) Appl. No.: 10/507,244

(22) PCT Filed: Mar. 12, 2002

(86) PCT No.: PCT/FR02/00883

§ 371 (c)(1),
(2), (4) Date: Jan. 10, 2006

(87) PCT Pub. No.: WO03/076200

PCT Pub. Date: Sep. 18, 2003

(65) Prior Publication Data

US 2006/0151935 A1 Jul. 13, 2006

(51) Int. Cl.
*G06K 7/00* (2006.01)
*B65H 3/44* (2006.01)

(52) U.S. Cl. .................... 271/9.09; 271/9.01; 271/3.01; 235/449

(58) Field of Classification Search ................ 271/9.01, 271/3.01, 165, 160, 166, 3.05, 163; 235/449
See application file for complete search history.

(56) References Cited

U.S. PATENT DOCUMENTS

| | | | | |
|---|---|---|---|---|
| 4,021,032 | A | 5/1977 | Gross et al. | |
| 4,682,768 | A * | 7/1987 | Iida et al. | 271/3.01 |
| 4,840,367 | A * | 6/1989 | Geyer et al. | 271/160 |
| 5,177,347 | A * | 1/1993 | Wike, Jr. | 235/462.38 |
| 5,177,547 | A * | 1/1993 | Kanemitsu et al. | 399/397 |
| 7,182,330 | B2 * | 2/2007 | Lindelof et al. | 271/138 |

FOREIGN PATENT DOCUMENTS

| | | | |
|---|---|---|---|
| DE | 37 04 059 | A | 8/1988 |
| DE | 3704059 | A1 * | 8/1988 |

* cited by examiner

*Primary Examiner*—Kaitlin S Joerger
(74) *Attorney, Agent, or Firm*—Lowe Hauptman Ham & Berner LLP

(57) ABSTRACT

The present invention concerns a device (DISP) for treating at least one surface of an object, having a first input (E1) for receiving objects (OBJ1) coming from a loader (CHRG) intended to contain a plurality of such objects, and including at least one operating chain having an input intended to receive objects from the first input (E1) of the device (DISP).

The device according to the invention has a second input (E2) for receiving objects (OBJ2) supplied individually by a user of the device (DISP), each operating chain being capable of receiving objects (OBJ2) inserted through said second input (E2).

The invention makes it possible to perform in series or one at a time several different types of surface treatment, by means of a device which can furthermore be implemented in a more compact form than the known devices.

20 Claims, 3 Drawing Sheets

DEVICE FOR SURFACE TREATMENT OF OBJECTS WITH REDUCED SIZE AND IMPROVED ERGONOMICS

RELATED APPLICATIONS

The present application is based on, and claims priority from, PCT application No. PCT/FR02/00883, filed Mar. 12, 2002, the disclosure of which is hereby incorporated by reference herein in its entirety.

The present invention concerns a device for treating at least one surface of an object, having an input for receiving objects coming from a loader intended to contain a plurality of such objects, and including at least one operating chain having an input intended to receive objects from the first input of the device, each operating chain including at least one operating station capable of carrying out an action on a surface of said object.

This type of device is commonly used for implementing surface treatments of plastic cards, in particular printing or else affixing or encoding of a magnetic strip on at least one face of such cards.

Such a treatment device is known from the U.S. Pat. No. 5,825,392. This device comprises two distinct and superposed operating chains, a first operating chain having an input disposed facing the input of the device and comprising a single operating station intended solely to implement printing on one face of a card coming from the loader, a second operating chain having an input disposed underneath the input of the first operating chain and comprising a single operating station intended solely to implement encoding of a magnetic strip disposed on one face of a card coming from the loader or from the first operating chain.

A card intended both to be printed and to receive a magnetic strip provided with encoding must pass through each of the two operating chains, at the expense of routing implemented by a complex system using rotary compartments.

Furthermore, each operating chain is provided with drive means making it possible to move objects from its input to its output, so that a plurality of distinct operating chains requires the installation, within the treatment device, of the same plurality of drive means, which results in, on the one hand, a large space requirement for the device, and, on the other hand, the presence of a more complex mechanism and therefore an increased risk of malfunctioning compared with a device which has only a single input and includes only a single operating chain intended to perform only a single type of surface treatment.

Finally, the known treatment device has only a single input intended to receive the objects to be treated from the loader, and therefore enables only high-volume treatment of cards and not one at a time, short of removing the loader and substituting an individual card for it, it however the known device enables this kind of manipulation, which otherwise may cause jamming or permanent damage to the device.

One of the aims of the invention is to remedy these drawbacks to a large extent, by proposing a surface treatment device capable of performing several types of treatment of one or more surfaces of an object which can equally well come from a loader or be supplied individually by a user of the device, which device furthermore being able to be implemented in a more compact form than the known device.

This is because a treatment device in accordance with the introductory paragraph is characterised according to a first aspect of the invention in that it has a second input, distinct from the first input and intended to receive objects supplied individually by a user of the device, each operating chain being capable of receiving objects inserted through said second input of the device.

The device according to this first aspect of the invention therefore allows equally well a serial treatment of cards coming from the loader or an individual treatment of cards supplied one at a time by a user of the device.

According to a variant of this first aspect of the invention, the device described above includes a single operating chain including a succession of operating stations.

The device according to this variant of the first aspect of the invention includes only a single operating chain, and requires drive means only in order to allow the movement of objects through this single operating chain. The fact that there is only one operating chain makes it possible to reduce the space requirement and complexity of the device, without for all that excluding the possibility of alternately using a loader or an individual input for supplying said device, since the input of the single operating chain can receive the objects to be treated equally well from the first or the second input. The device according to this variant of the first aspect of the invention is capable of performing several types of treatment of one or more surfaces of an object without for all that requiring the routing of said object from one operating chain to another between two different surface treatments.

According to a particular embodiment of this variant, the action that at least one operating station is capable of carrying out can be previously inhibited or enabled by programming.

This particular embodiment in addition makes it possible to determine flexibly the treatment to be applied to each object. A selection of the treatment to be applied to each object is made possible in the known device, but at the expense of as many operating chains as there are possible treatments, and decision and routing processes which have to be performed for each card, which must be physically transported from one operating chain to another in order to enable the corresponding treatment. Inhibiting or enabling by programming of the actions of the operating stations included in the single operating chain allows an easily modifiable configuration thereof and, once the desired configuration has been programmed, a serial treatment of the objects, for example from the loader, which makes it possible to reduce the production cost of the treatment applied to each object by increasing the treatment rate compared with the known device, for which at least one operation of routing each object between two distinct operating chains is unavoidable for implementing at least two different surface treatments.

According to another variant of this first aspect of the invention, the first and second inputs of the device are situated either side of the operating chain, the device being provided with routing means for routing to the input of the operating chain an object introduced into the device through its second input.

This other variant is advantageous in ergonomic terms, since it makes it possible to avoid any confusion in the mind of a user of the device regarding the respective positions of the first and second inputs, which are disposed as far as possible from each other according to this other variant, which therefore makes it possible to simplify actions for supplying the device with individual objects through the second input which the user will be led to carry out, which makes it possible to reduce further the production cost of surface treatments implemented by this device.

Furthermore, this other variant of the invention makes possible the routing to the input of the operating chain of an object introduced through the second input of the device by means of a translational movement, which will facilitate the routing of objects which are rigid or not very flexible.

In a particularly advantageous embodiment of this other variant, the operating chain is provided with drive means making it possible to move the objects from its input to an output of said operating chain, said drive means being capable of being configured in a reverse working mode in which they make it possible to move the objects from the output to the input of the operating chain, the second input of the device being disposed facing said output of the operating chain, the routing means being formed by said drive means configured in reverse working mode.

This embodiment uses pre-existing resources, in this case the drive means of the operating chain, for implementing the routing means, which avoids increasing the complexity of the device.

According to a second aspect of the invention, the loader is provided with a first wall intended to prevent motion in a first direction of the objects contained in the loader, and with a second wall intended to prevent motion of said objects in a second direction perpendicular to the first direction, the first and second walls having ends which are separated by an opening intended to be passed through by an object, at least part of said second wall of the loader being movable, the treatment device being provided with movement means for controlling a movement of said movable part of the second wall enabling an adjustment of the size of said opening.

This second aspect of the invention is advantageous in that it enables a serial treatment of objects which can have variable thicknesses, since the size of the opening of the loader, through which said objects are routed to the input of the operating chain, is adjustable.

According to a third aspect of the invention, the loader is provided with a first wall intended to prevent motion in a first direction of the objects contained in the loader, and with a second wall intended to prevent motion of said objects in a second direction perpendicular to the first direction, the first and second walls having ends which are separated by an opening intended to be passed through by an object, the loader including a slider block capable of moving along the second wall in the first direction under the effect of a force produced by an elastic element, the objects contained in the loader being intended to be disposed between said slider block and the first wall, the loader also including regulation means intended to keep substantially constant the force exerted on that one of the objects contained in the loader which is closest to the first wall.

This third aspect of the invention is advantageous in that it allows extraction under uniform conditions of the objects from the loader. This is because, by virtue of the regulation means, an object directly in contact with the slider block or an object separated from said slider block by a stack of other objects will be subjected to a substantially identical pressure, although the elastic element is more compressed in the presence of a stack of objects than in the presence of a single object, and an object placed underneath a stack of such objects is in addition subjected to a gravitational force exerted by said stack. This makes it possible to know precisely the conditions under which extraction means, for example a roller with which the object intended to be extracted from the loader will be in contact, will be led to work under all circumstances, and to design and dimension said extraction means in an optimum manner in order to provide efficient working thereof, whether the loader is full or almost empty.

In a particular embodiment of this third aspect of the invention, the regulation means include a spring disposed parallel to the second direction and connected to a first and a second articulation respectively arranged between first and second rods, on the one hand, and third and fourth rods, on the other hand, ends of the first and second rods being connected by hinge joints to first and second guide channels respectively arranged in the loader and the slider block, and ends of the third and fourth rods being connected by hinge joints to fixed points respectively arranged in the loader and the slider block.

According to a fourth aspect of the invention, the loader being provided with a first wall intended to prevent motion in a first direction of the objects contained in the loader, the treatment device also includes spacing means intended to move in the first direction that one of the objects contained in the loader which is closest to the first wall in order to move it away from said first wall in order to make, between said object and said first wall, a storage space capable of at least partially receiving an object coming from the operating chain.

This aspect of the invention makes it possible to arrange a storage space included in a pre-existing volume delimited by an enclosure of the loader, which storage space can serve as a waiting position for objects at the input of the operating chain. This aspect of the invention therefore enables objects at the input of the operating chain to be kept in such a waiting position without requiring the creation of an additional space for that purpose, which makes it possible to further reduce the total space requirement of the treatment device.

The characteristics of the invention mentioned above, as well as others, will emerge more clearly from a reading of the following description of an example implementation, said description being given in relation to the accompanying drawings, amongst which:

FIG. 1 depicts schematically a device DISP for treating at least one surface of an object OBJ1 or OBJ2, having a first and a second input E1 and E2 for receiving respectively objects OBJ1 coming from a loader CHRG intended to contain a plurality of such objects, and objects OBJ2 supplied individually by a user of the device.

Figure 1:
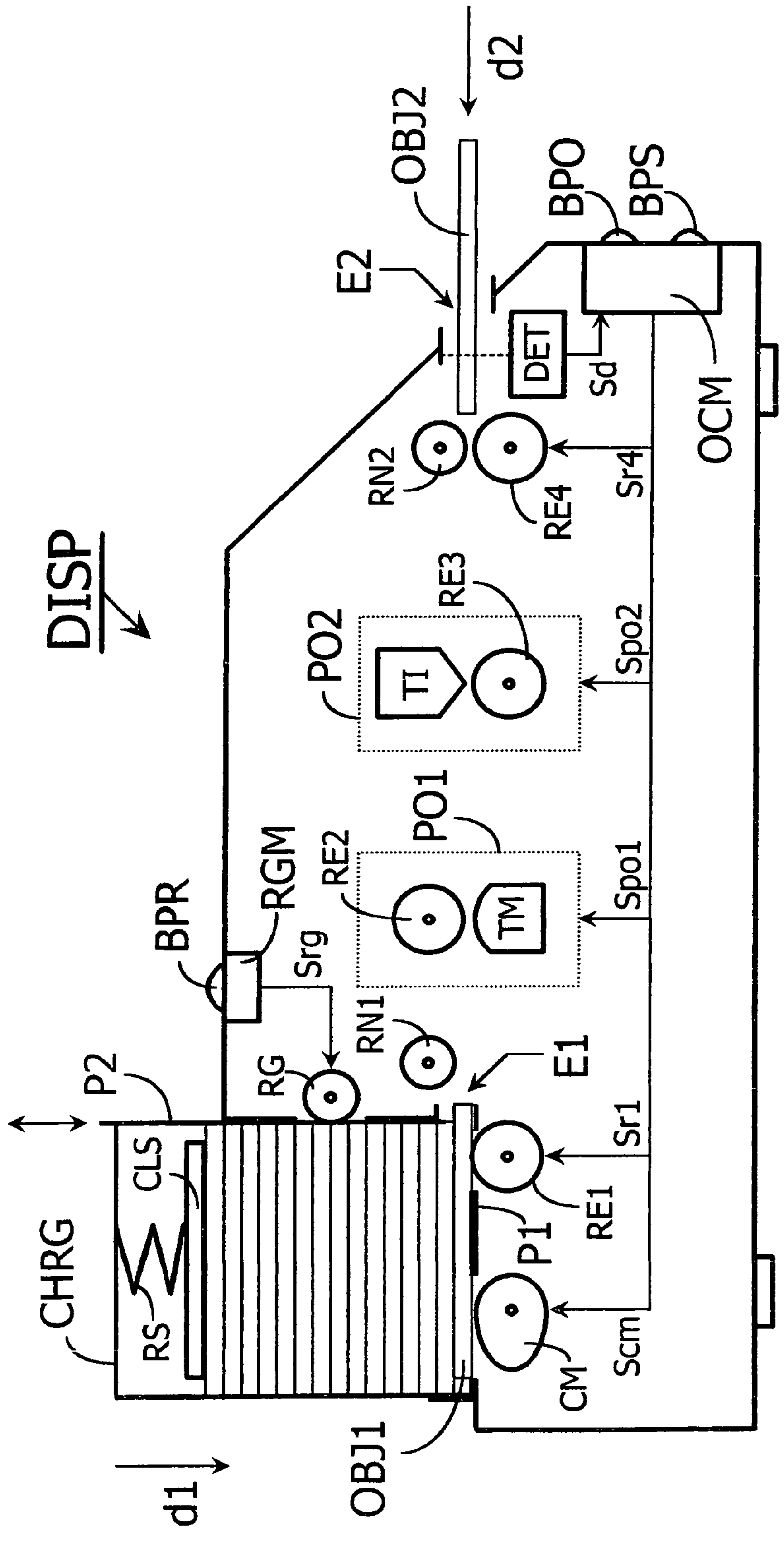
FIG. 1 is a schematic sectional view of a treatment device according to a preferred embodiment of the invention.

This device DISP includes a single operating chain having an input intended to receive objects OBJ1 or OBJ2 from one or other of the first and second inputs E1 and E2 of the device, which operating chain includes two successive operating stations PO1 and PO2, each capable of carrying out an action on at least one surface of said object. In this example, the first operating station PO1 is intended to implement, by means of a magnetic head TM, encoding of a magnetic strip disposed on a lower surface of the objects to be treated. The second operating station PO2 is intended to implement, by means of a print head TI, printing of an upper surface of the objects to be treated.

In this particular embodiment of the invention, the actions, encoding or printing, that the operating stations PO1 and PO2 are capable of carrying out can be previously inhibited or on the contrary enabled by programming. To that end, the device DISP has a control panel provided with a button BPO, on which a user of the device DISP can act in order to select the operating stations whose actions he wishes to inhibit or enable. Actions on this button BPO will be detected by a control module OCM, which will translate them into electrical signals Spo1 and Spo2 having states or values which will represent the choice of the user, and will order the inhibiting or enabling of the working of the operating stations PO1 and PO2. At the end of an initialisation of the device DISP, the signals Spo1 and Spo2 can for example both be assigned by default a value enabling the working of the operating stations PO1 and PO2, a single press on the button BPO ordering the inhibiting of one of said stations PO1 or PO2, whereas two successive presses will order the inhibiting of the other station PO2 or PO1. This embodiment thus makes it possible to flexibly configure the operating chain according to the nature of the surface treatment or treatments to be implemented and, once the desired configuration has been programmed, to treat objects in series, for example from the loader CHRG, which makes it possible to reduce the production cost of the treatment applied to each object by increasing the treatment rate compared with the known device, for which at least one manipulation of each object between distinct operating stations is unavoidable.

In this particular embodiment of the invention, the first and second inputs E1 and E2 of the device DISP are situated either side of the operating chain, the device DISP being provided with routing means for routing to the input of the operating chain an object OBJ2 introduced into the device DISP through its second input E2.

Such a layout of the first and second inputs E1 and E2 is advantageous in ergonomic terms, since it makes it possible to avoid any confusion in the mind of a user of the device DISP regarding the respective positions of the first and second inputs E1 and E2, which are here disposed as far as possible from each other. This therefore makes it possible to simplify the supplying of the device DISP with individual objects OBJ2 through the second input E2, which makes it possible to further reduce the production cost of the treatment implemented by this device DISP.

Furthermore, this other variant of the invention makes possible the routing to the input of the operating chain of an object OBJ2 introduced through the second input E2 of the device DISP by means of a translational movement, which will facilitate the routing of objects which are rigid or not very flexible.

The operating chain is provided with drive means, constituted in this example by rollers RE1, RE2, RE3 and RE4 capable of being driven rotationally with the aim of moving the objects from the input of said operating chain to an output, which output is in this example situated facing the second input E2 of the device DISP. The drive means RE1, RE2, RE3 and RE4 are capable of being configured, on the instruction of a user of the device DISP, in a reverse working mode in which the direction of rotation of the rollers is reversed in order to allow routing of objects from the second input E2 to the input of the operating chain. The routing means will thus be constituted by pre-existing resources, in this case the drive means configured in reverse working mode. This configuration is implemented in this example by means of electrical signals Sr1, Spo1, Spo2 and Sr4, respectively, which signals will be generated by the control module OCM controlled by the user by means of a control button BPS. The device DISP can also be provided with a detector DET of the insertion of an object OBJ2 through the second input, for example a photoelectric sensor, which can automatically cause a configuration of the drive means RE1, RE2, RE3 and RE4 into reverse working mode via the control module OCM and the electrical signals Sr1, Spo1, Spo2 and Sr4 as soon as such an insertion has been detected by the insertion detector DET and signalled to the control module OCM by activation of a detection signal Sd, which activation can for example be given substance to by a change from a logic level "0" to a logic level "1" of said detection signal Sd.

Two cleaning rollers RN1 and RN2, disposed respectively facing the first and second inputs E1 and E2, also make it possible to ensure that the objects to be treated are free from dust or other impurities before their treatment by the operating chain, irrespective of the input E1 or E2 through which they were inserted.

In this particular embodiment of the invention, the loader CHRG is provided with a first wall P1 intended to prevent motion in a first direction d1 of the objects OBJ1 contained in the loader CHRG, and with a second wall P2 intended to prevent motion of said objects OBJ1 in a second direction d2 perpendicular to the first direction d1, in a sense opposite to that assigned to the second direction d2 in this example. The first and second walls P1 and P2 have ends which are separated by an opening intended to be passed through by an object OBJ1. The loader CHRG includes a slider block CLS capable of moving along the second wall P2 in the first direction d1 under the effect of a force produced by an elastic element, for example a spring RS, the objects OBJ1 contained in the loader CHRG being intended to be disposed between said slider block CLS and the first wall P1. In the example described here, the second wall P2 of the loader CHRG is movable in the direction d1 and the treatment device DISP is provided with movement means, which include a cylindrical element RG capable of being driven rotationally about an axis perpendicular to the first and second directions d1 and d2 on the command of an electrical signal Srg generated by an adjustment module RGM in response to a command carried out by a user of the device DISP on an adjustment button BPR, in order to control a movement of said second wall P2 and to thus implement an adjustment of the size of said opening.

This embodiment of the loader CHRG and of the device DISP is advantageous in that it enables a serial treatment of objects OBJ1 which can have variable thicknesses, since the size of the opening of the loader CHRG, through which said objects OBJ1 are routed to the input of the operating chain, is adjustable.

In this particular example implementation of the loader CHRG, the second wall P2 is movable all in one piece, but provision can be made, in other embodiments, that only a portion of this second wall P2, located in the region of the opening, is movable for the purposes of adjusting the size of said opening.

The technical advantage provided by the mobility, total or partial, of the second wall P2 will retain all its importance in applications other than the one described here, in particular within the context of a use where the treatment device has only a single input intended to receive the objects stored in the loader.

Figure 2:
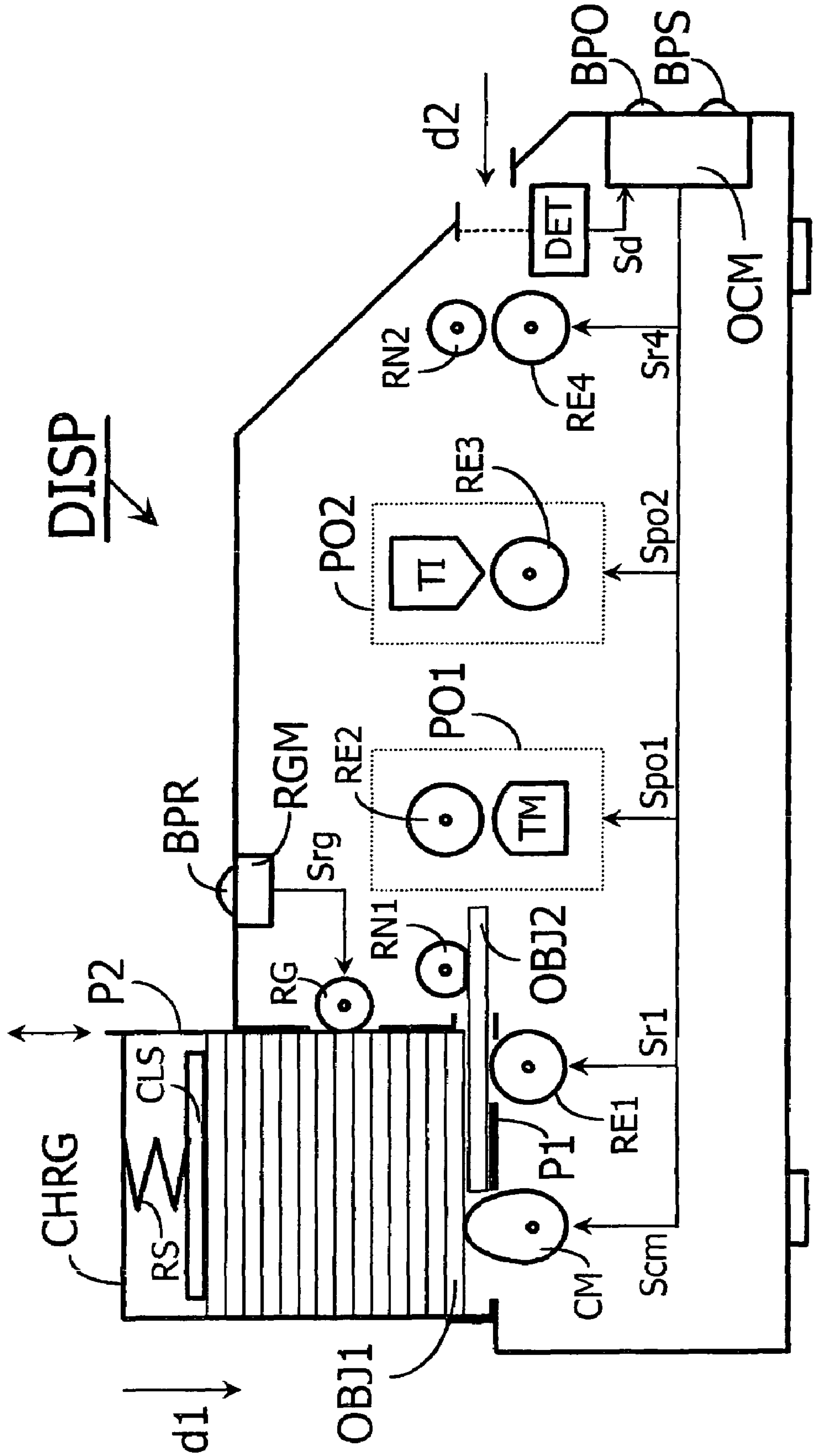
FIG. 2 is a schematic sectional view of this device in one particular configuration.

FIG. 2 depicts schematically this device DISP in one particular configuration. In fact, in this particular embodiment of the invention, the treatment device DISP also includes spacing means intended to move in the first direction d1 that one of the objects OBJ1 contained in the loader CHRG which is closest to the first wall P1 in order to move it away from said first wall P1 in order to make, between said object and said first wall P1, a storage space capable of at least partially receiving an object coming from the operating chain. In the example implementation described here, the spacing means include a cam CM capable of pivoting about an axis perpendicular to the first and second directions d1 and d2, on the command of an electrical signal Scm generated by the control module OCM. In this configuration, the rotation of the cam CM causes a rising of the objects OBJ1 included in the loader CHRG, which frees within said loader a storage space into which another object, in this example an object OBJ2 coming from the second input E2, can be inserted and kept awaiting its treatment by the operating chain, without requiring the creation of an additional space for that purpose, which makes it possible to further reduce the total space requirement of the treatment device DISP. In one particular embodiment of the spacing means, provision can be made that an activation of said means will simultaneously cause a momentary inhibition, for example by disengaging of their drive rollers, of the operating stations PO1 and PO2, in order to guarantee their inactivity when the object to be treated is in the waiting position.

The technical advantage provided by the spacing means will retain all its importance in applications other than the one described here, in particular within the context of a use where the treatment device has only a single input intended to receive the objects stored in the loader.

Figure 3:
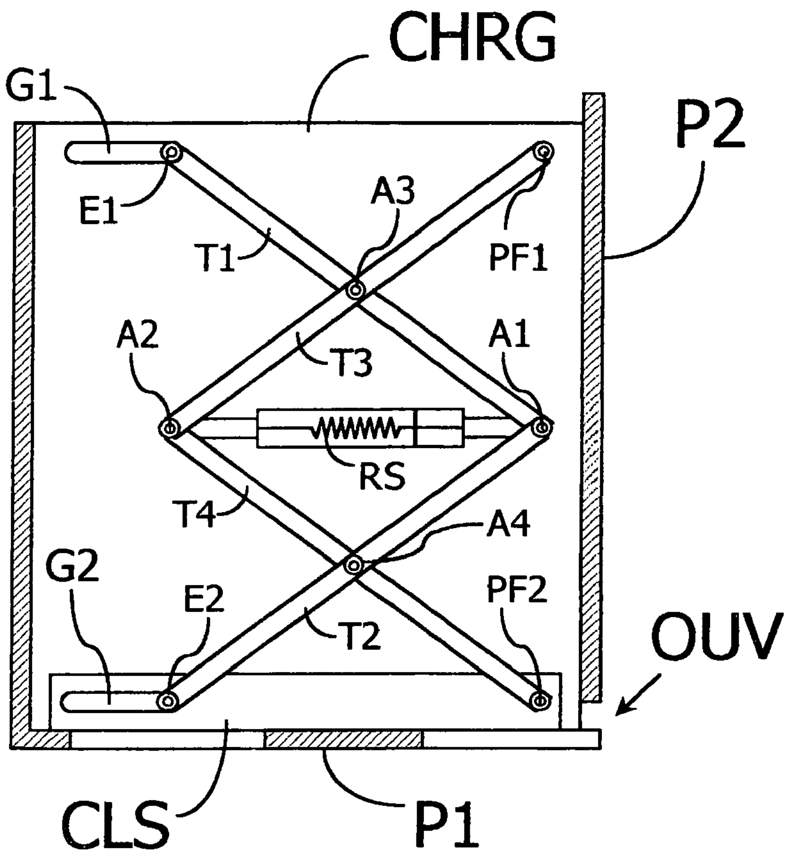
FIG. 3 is a sectional view of an empty loader in accordance with a variant of the invention.
Figure 4:
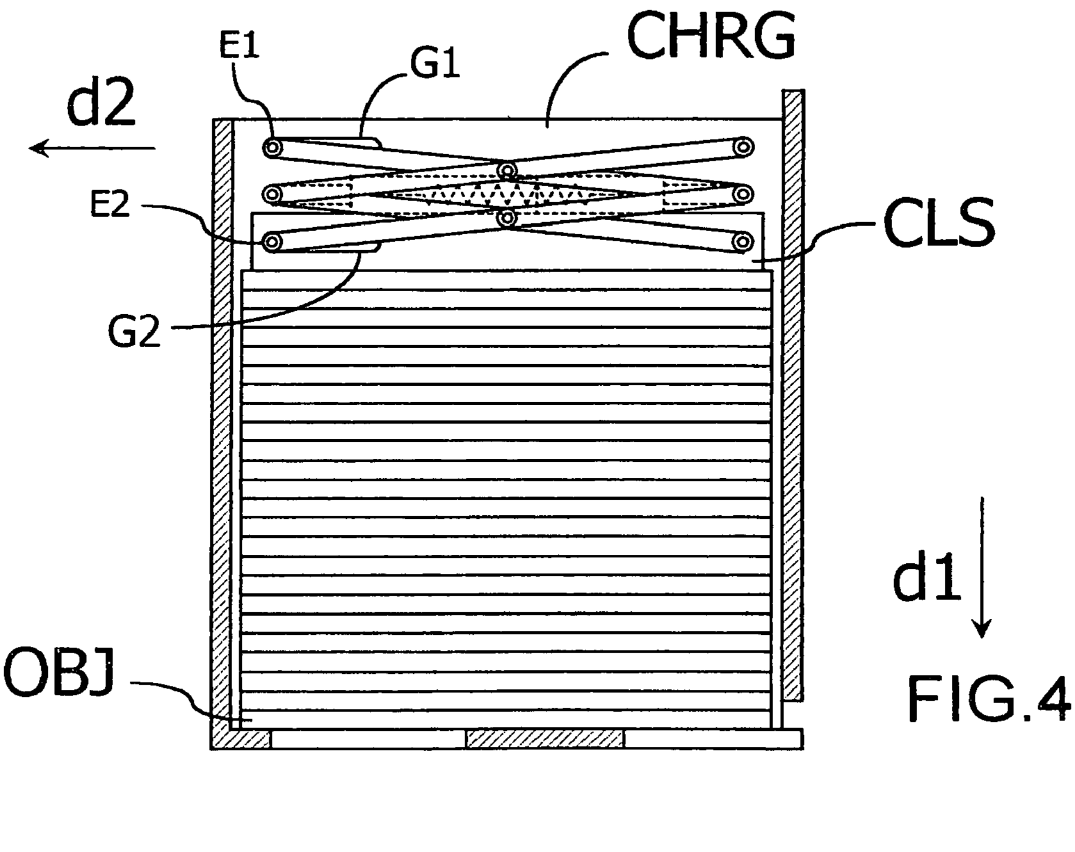
FIG. 4 is a sectional view of a full loader in accordance with this variant of the invention.

FIGS. 3 and 4 depict a loader CHRG in accordance with another aspect of the invention, in respectively empty and full states. As described previously, this loader CHRG is provided with a first wall P1 intended to prevent motion in a first direction d1 of objects contained in the loader, and with a second wall P2 intended to prevent motion of said objects in a second direction d2 perpendicular to the first direction d1, in a sense opposite to that assigned to the second direction d2 in this example, the first and second walls P1 and P2 having ends which are separated by an opening OUV intended to be passed through by an object OBJ. The loader CHRG includes a slider block CLS capable of moving along the second wall P2 in the first direction d1 under the effect of a force produced by a spring RS, the objects contained in the loader CHRG being intended to be disposed between said slider block CLS and the first wall P1. The objects can in general terms have diverse forms. In the example described here, these objects can be constituted by plastic cards conforming to the ISO CR80 format. According to this aspect of the invention, the loader CHRG also includes regulation means intended to keep substantially constant the force exerted on that one of the objects OBJ contained in the loader which is closest to the first wall P1.

This aspect of the invention is advantageous in that it allows extraction under uniform conditions of the objects from the loader CHRG. This is because, by virtue of the regulation means, an object OBJ directly in contact with the slider block CLS or an object separated from said slider block by a stack of other objects will be subjected to a substantially identical pressure, although the spring RS is more compressed in the presence of a stack of objects than in the presence of a single object, and an object OBJ placed underneath a stack of such objects is in addition subjected to a gravitational force exerted by said stack. This makes it possible to know precisely the conditions under which extraction means, for example a roller with which the object OBJ intended to be extracted from the loader CHRG will be in contact, will be led to work under all circumstances, and to design and dimension said extraction means in an optimum manner in order to provide efficient working thereof, whether the loader CHRG is full or almost empty.

In this embodiment of the invention, the regulation means include a spring RS, for example a cylindrical spring about an axis of revolution disposed parallel to the second direction d2, connected to a first and a second articulation A1 and A2, in this example hinge joints, between first and second rods T1 and T2, on the one hand, and third and fourth rods T3 and T4, on the other hand. Ends E1 and E2 of the first and second rods T1 and T2 are connected by sliding hinge joints to guide channels G1 and G2 respectively arranged in the loader CHRG and the slider block CLS. Ends PF1 and PF2 of the third and fourth rods T3 and T4 are connected by hinge joints to fixed points arranged in the loader CHRG and the slider block CLS.

The guide channel connections connecting respectively the ends E1 and E2 to the loader CHRG and to the slider block CLS make it possible to increase an angle which the rods T1, T2, T3, T4 have with the second direction d2, which is in principle the horizontal direction, as the loader CHRG is emptied of the objects it initially contained. Furthermore, the force exerted by the spring RS in the first direction d1 on these objects is proportional to the sine of said angle, which implies that this force increases as the value of said angle increases. Moreover, the gravitational force exerted by the stack of cards placed on top of the object OBJ which is closest to the first wall P1 of the loader CHRG will decrease as the loader CHRG is emptied of the objects it contains. The result of this is that the increase in the force exerted in the first direction d1 on the object OBJ by the spring RS, which is caused by the reduction in the number of cards in the loader CHRG and the resulting increase in the angle between the rods T1, T2, T3 and T4 and the second direction d2, will be compensated for by the reduction in the gravitational force exerted by the stack of objects situated on top of said object OBJ as the number of objects forming said stack decreases, with the effect of keeping substantially constant the resultant in the first direction d1 of said forces.

The technical advantage provided by the regulation means will retain all its importance in applications other than the one described here, in particular within the context of a use where the treatment device has only a single input intended to receive the objects stored in the loader.

The invention claimed is:

1. Device for treating at least one surface of an object, the device having a first input for receiving objects coming from a loader for containing a plurality of such objects, a second input, distinct from the first input, for receiving objects supplied individually by a user of the device, an operating chain including a succession of operating stations, a first of the stations being arranged for applying first indicia to a surface of said object and a second of the stations being arranged for applying second indicia to a surface of said object, said operating chain having an input for receiving objects from the first and second inputs of the device, the first and second inputs of the device being situated on both sides of said operating chain, the device including a router for routing to the input of said operating chain an object introduced into the device through its second input.

2. Treatment device according to claim 1, further including a programming arrangement for previously inhibiting or enabling the action that at least one operating station is capable of carrying out.

3. Treatment device according to claim 1, wherein the operating chain includes a drive for moving the objects from its input to an output of said operating chain, said drive being capable of being configured in a reverse working mode in which the drive can move the objects from the output to the input of the operating chain, and the second input of the device being disposed so it faces said output of the operating chain, the router including by said drive configured in a reverse working mode.

4. Treatment device according to claim 1, wherein the loader includes a first wall for preventing motion in a first direction of the objects contained in the loader, and a second wall for preventing motion of said objects in a second direction perpendicular to the first direction, the first and second walls having ends which are separated by an opening arranged so it can be passed through by an object, at least part of said second wall of the loader being movable, the treatment device including a drive for controlling movement of said movable part of the second wall for enabling adjustment of the size of said opening.

5. A treatment device according to claim 1, wherein the loader includes a first wall for preventing motion in a first direction of the objects contained in the loader, and second wall for preventing motion of said objects in a second direction perpendicular to the first direction, the first and second walls having ends which are separated by an opening arranged so it can be passed through by an object, the loader including a slider block for moving along the second wall in the first direction under the effect of a force produced by an elastic element, the objects contained in the loader being disposed between said slider block and the first wall, the loader also including a regulator for maintaining substantially constant the force exerted on the object contained in the loader which is closest to the first wall.

6. Treatment device according to claim 5, wherein the regulator includes a spring disposed parallel to the second direction and connected to a first and a second articulation respectively arranged between first and second rods, on the one hand, and third and fourth rods, on the other hand, ends of the first and second rods being connected by hinge joints to first and second guide channels respectively arranged in the loader and the slider block, and ends of the third and fourth rods being connected by hinge joints to fixed points respectively arranged in the loader and the slider block.

7. Treatment device according to claim 1, wherein the loader includes a first wall for preventing motion in a first direction of the objects contained in the loader, the device also including a spacer for movement in the first direction that the object contained in the loader which is closest to the first wall for moving it away from said first wall for forming, between said object and said first wall, a storage space for at least partially receiving an object coming from the operating chain.

8. Treatment device according to claim 2, wherein the operating chain includes a drive for moving the objects from its input to an output of said operating chain, said drive capable of being configured in a reverse working mode in which the objects can be moved from the output to the input of the operating chain, and the second input of the device facing said output of the operating chain, the router including said drive configured in reverse working mode.

9. Treatment device according to claim 2, wherein the loader includes a first wall for preventing motion in a first direction of the objects contained in the loader, and a second wall for preventing motion of said objects in a second direction perpendicular to the first direction, the first and second walls having ends which are separated by an opening arranged to be passed through by an object, at least part of said second wall of the loader being movable, the treatment device including a drive for controlling movement of said movable part of the second wall for adjusting the size of said opening.

10. Treatment device according to claim 3, wherein the loader includes a first wall for preventing motion in a first direction of the objects contained in the loader, and second wall for preventing motion of said objects in a second direction perpendicular to the first direction, the first and second walls having ends which are separated by an opening arranged to be passed through by an object, at least part of said second wall of the loader being movable, the treatment device including a drive for controlling movement of said movable part of the second wall for enabling adjustment of the size of said opening.

11. A treatment device according to claim 2, wherein the loader includes a first wall for preventing motion in a first direction of the objects contained in the loader, and second wall for preventing motion of said objects in a second direction perpendicular to the first direction, the first and second walls having ends which are separated by an opening arranged so it can be passed through by an object, the loader including a slider block for moving along the second wall in the first direction under the effect of a force produced by an elastic element, the objects contained in the loader being disposed between said slider block and the first wall, the loader also including a regulator for maintaining substantially constant the force exerted on the object contained in the loader which is closest to the first wall.

12. A treatment device according to claim 3, wherein the loader includes a first wall for preventing motion in a first direction of the objects contained in the loader, and second wall for preventing motion of said objects in a second direction perpendicular to the first direction, the first and second walls having ends which are separated by an opening arranged so it can be passed through by an object, the loader including a slider block for moving along the second wall in the first direction under the effect of a force produced by an elastic element, the objects contained in the loader being disposed between said slider block and the first wall, the loader also including a regulator for maintaining substantially constant the force exerted on the object contained in the loader which is closest to the first wall.

13. Treatment device according to claim 2, wherein the loader includes a first wall for preventing motion in a first direction of the objects contained in the loader, the device also including a spacer for movement in the first direction that the object contained in the loader which is closest to the first wall for moving it away from said first wall for forming, between said object and said first wall, a storage space for at least partially receiving an object coming from the operating chain.

14. Treatment device according to claim 3, wherein the loader includes a first wall for preventing motion in a first direction of the objects contained in the loader, the device also including a spacer for movement in the first direction that the object contained in the loader which is closest to the first wall for moving it away from said first wall for forming, between said object and said first wall, a storage space for at least partially receiving an object coming from the operating chain.

15. Treatment device according to claim 1 wherein at least one of the operating stations includes a magnetic strip encoder for applying a magnetic strip to the surface of said object.

16. Treatment device according to claim 1 wherein at least one of the operating stations includes a printer for applying a printed strip to the surface of said object.

17. The device of claim 1 wherein the first and second stations are arranged to apply the indicia to first and second opposite sides of the object.

18. The device of claim 17 wherein the first and second stations are respectively arranged for applying first and second types of indicia to the first and second surfaces of the object.

19. The device of claim 18 wherein the first and second indicia types are respectively printing and magnetic flux.

20. The device of claim 1 wherein the first and second indicia are respectively printing and magnetic flux.

* * * * *